US012453963B2

(12) United States Patent
Mercer

(10) Patent No.: US 12,453,963 B2
(45) Date of Patent: Oct. 28, 2025

(54) MODIFIED CATALYST SUPPORTS AND CATALYSTS SUPPORTED THEREON

(71) Applicant: JOHNSON MATTHEY PUBLIC LIMITED COMPANY, London (GB)

(72) Inventor: Richard Mercer, Billingham (GB)

(73) Assignee: Johnson Matthey Public Limited Company, London (GB)

(*) Notice: Subject to any disclaimer, the term of this patent is extended or adjusted under 35 U.S.C. 154(b) by 473 days.

(21) Appl. No.: 18/003,815

(22) PCT Filed: Aug. 4, 2021

(86) PCT No.: PCT/GB2021/052006
§ 371 (c)(1),
(2) Date: Dec. 29, 2022

(87) PCT Pub. No.: WO2022/053773
PCT Pub. Date: Mar. 17, 2022

(65) Prior Publication Data
US 2023/0241592 A1    Aug. 3, 2023

(30) Foreign Application Priority Data
Sep. 9, 2020 (GB) .................................. 2014184

(51) Int. Cl.
B01J 23/89 (2006.01)
B01J 21/06 (2006.01)
B01J 23/75 (2006.01)
B01J 35/30 (2024.01)
B01J 35/40 (2024.01)
B01J 35/45 (2024.01)
B01J 35/51 (2024.01)
B01J 35/61 (2024.01)
B01J 35/63 (2024.01)
B01J 35/64 (2024.01)
B01J 35/77 (2024.01)
B01J 37/02 (2006.01)
C10G 2/00 (2006.01)

(52) U.S. Cl.
CPC ......... B01J 23/8946 (2013.01); B01J 21/063 (2013.01); B01J 21/066 (2013.01); B01J 23/75 (2013.01); B01J 35/393 (2024.01); B01J 35/45 (2024.01); B01J 35/613 (2024.01); B01J 35/635 (2024.01); B01J 35/647 (2024.01); B01J 35/77 (2024.01); B01J 37/0207 (2013.01); C10G 2/331 (2013.01); B01J 35/40 (2024.01); B01J 35/51 (2024.01); B01J 2235/15 (2024.01)

(58) Field of Classification Search
CPC ...... B01J 23/8946; B01J 35/45; B01J 35/647; B01J 35/393; B01J 35/613; B01J 35/635; B01J 35/77; B01J 21/063; B01J 21/066; B01J 23/75; B01J 37/0207; B01J 35/51; B01J 35/40; B01J 2235/15; C10G 2/331

USPC ................ 502/327, 350, 302–304; 518/715
See application file for complete search history.

(56) References Cited

U.S. PATENT DOCUMENTS

| 4,663,305 | A  | * | 5/1987  | Mauldin ................. B01J 23/83 |
|           |    |   |         | 518/715                             |
| 7,585,808 | B2 |   | 9/2009  | Malek et al.                        |
| 7,879,759 | B2 |   | 2/2011  | Augustine et al.                    |
| 2010/0022388 | A1 | * | 1/2010 | Soled ....................... B01J 35/30 |
|           |    |   |         | 502/325                             |
| 2010/0099553 | A1 |   | 4/2010 | Sietsma et al.                      |
| 2014/0045953 | A1 | * | 2/2014 | Daly ........................ C07C 1/043 |
|           |    |   |         | 502/241                             |
| 2014/0088206 | A1 |   | 3/2014 | Daly et al.                         |
| 2016/0016154 | A1 |   | 1/2016 | Richard et al.                      |
| 2018/0207614 | A1 |   | 7/2018 | Ferguson et al.                     |
| 2020/0101445 | A1 |   | 4/2020 | Mukherjee et al.                    |
| 2020/0306728 | A1 |   | 10/2020 | Becker et al.                      |
| 2021/0008527 | A1 | * | 1/2021 | Paterson ................ C10G 2/332 |
| 2022/0097029 | A1 | * | 3/2022 | Mercer ..................... B01J 6/001 |
| 2022/0220053 | A1 | * | 7/2022 | Sunley .................. B01J 23/8892 |

FOREIGN PATENT DOCUMENTS

| CN | 1409633 A   | 4/2003 |
|----|-------------|--------|
| CN | 102307656 A | 1/2012 |
| EP | 0370757 A1  | 5/1990 |

(Continued)

OTHER PUBLICATIONS

Ti Pnapa Wongsalee, et al., "Effect of Zirconia-modified Titania Consisting of Different Phases on Characteristics and Catalytic Properties of Co/TiO2 Catalysts", Catalysis Letters, Kluwer Academic Publishers—Plenum Publishers, NE, vol. 108, No. 1-2, Apr. 1, 2006 (Apr. 1, 2006), pp. 55-61, XP019275411, ISSN: 1572-879X the whole document.

(Continued)

Primary Examiner — Patricia L. Hailey
(74) Attorney, Agent, or Firm — BakerHostetler

(57) ABSTRACT

A modified catalyst support is described in the form of titania particles with a volume-median diameter in the range 100 to 1000 μm modified with one or more refractory oxides of metals selected from the group consisting of zirconium, lanthanum, cerium, yttrium and neodymium, wherein the total refractory oxide content of the modified catalyst support is in the range of 0.1 to 15% by weight, and the modified catalyst support has a pore volume in the range of 0.2 to 0.6 cm³/g and an average pore diameter in the range of 30 to 60 nm. The modified catalyst support may be used to prepare cobalt Fischer-Tropsch catalysts suitable for use in fixed bed processes.

25 Claims, No Drawings

(56) References Cited

FOREIGN PATENT DOCUMENTS

| GB | 2582220 A | 9/2020 | |
|---|---|---|---|
| JP | S63-236543 A | 10/1988 | |
| JP | 2006-506224 A | 2/2006 | |
| JP | 2019-524631 A | 9/2019 | |
| WO | 2011/048361 A1 | 4/2011 | |
| WO | 2012/107718 A2 | 8/2012 | |
| WO | 2012/146903 A1 | 11/2012 | |
| WO | WO-2012153218 A1 * | 11/2012 | ............... C10G 3/50 |
| WO | 2014120922 A1 | 8/2014 | |
| WO | 2016/011299 A1 | 1/2016 | |
| WO | 2016/050520 A1 | 4/2016 | |
| WO | 2017/009428 A1 | 1/2017 | |

OTHER PUBLICATIONS

Dr Alan Rawle, "Basic Principles of Particle Size Analysis", Malvern Instruments Ltd, Malvern, UK (www.malvern.co.uk).

* cited by examiner

MODIFIED CATALYST SUPPORTS AND CATALYSTS SUPPORTED THEREON

This invention relates to modified catalyst support materials, and cobalt-containing Fischer-Tropsch catalyst precursors and catalysts supported thereon.

Fischer-Tropsch catalysts having a nominal diameter less than about 1 mm offer the possibility of high reaction rates and improved selectivity to C5+ hydrocarbons. Such catalysts are usually associated with use in a suspended state, such as in a slurry bubble column reactor, because their use in a fixed bed at a commercial scale would normally be rendered impractical by an unacceptably high pressure drop. WO2012/146903 A1 discloses a Fischer-Tropsch process using a fixed bed of small particle catalyst wherein the catalyst is disposed within a plurality of catalyst containers placed within externally-cooled reaction tubes. The catalyst particles may have a diameter of from about 100 μm to about 1 mm.

Titania microspheres provide an ideal support for fixed-bed cobalt Fischer-Tropsch catalysts because they may be regular in shape, essentially free of poisons and can have a large median pore diameter, facilitating growth of long hydrocarbon chains on small well dispersed cobalt crystallites.

However, the strength of titania microspheres can be lower than other supports and when calcined at elevated temperature in order to increase the strength, the pore volume collapses rapidly and anatase is converted to rutile. These changes are undesirable as they can effect the ability of the support to maintain cobalt crystallites in the pores, which in turn effects the catalyst activity and selectivity. Moreover, titania microspheres are typically prepared from titania particles created by flame hydrolysis of titanium tetrachloride, which provides microspheres with a high chloride content that creates a risk of stress corrosion cracking of austenitic stainless steels typically used in catalyst manufacturing equipment.

It has surprisingly been found that modification of titania microspheres with low levels of certain refractory metal oxides results in improved strength whilst retaining the pore structure required to generate an effective Fischer-Tropsch catalyst. Surprisingly, it has also been found that these modified supports offer improved catalytic activity in comparison to unmodified titania supports. It has also been found that the chloride content of the modified supports is much reduced.

Accordingly, the invention provides a modified catalyst support in the form of titania particles with a volume-median diameter in the range 100 to 1000 μm modified with one or more refractory oxides of metals selected from the group consisting of zirconium, lanthanum, cerium, yttrium and neodymium, wherein the total refractory oxide content of the modified catalyst support is in the range of 0.1 to 15% by weight, and the modified catalyst support has a pore volume in the range of 0.2 to 0.6 $cm^3/g$ and an average pore diameter in the range of 30 to 60 nm.

The invention further provides a catalyst precursor comprising cobalt oxide crystallites disposed within pores of the modified catalyst support.

The invention further provides a catalyst comprising cobalt metal crystallites disposed within the pores of the modified catalyst support.

The invention further provides a method for preparing the modified catalyst support comprising the steps of impregnating titania particles, with a volume-median diameter in the range 100 to 1000 m, with a solution of one or more metals selected from the group consisting of zirconium, lanthanum, cerium, yttrium and neodymium, and drying and calcining the impregnated titania support to form a refractory metal oxide modified titania support comprising refractory oxide in the range 0.1 to 15% by weight.

The invention further provides a method for preparing the catalyst precursor comprising the steps of impregnating the modified titania support with cobalt compound and drying and calcining the impregnated modified titania support to form cobalt oxide crystallites within the pores of the modified titania support.

The invention further provides a combination of the catalyst precursor, or the catalyst, disposed within a catalyst carrier suitable for use in a reaction tube of a reactor or within channels in a microchannel reactor.

The invention further provides the use of the catalyst precursor, the catalyst or the combination in a reactor in a process to produce hydrocarbons from a synthesis gas comprising hydrogen and carbon monoxide.

The modified catalyst support, catalyst precursor, catalyst and combination are all particularly suitable for use in a Fischer-Tropsch process to synthesise hydrocarbons from a synthesis gas comprising hydrogen and carbon monoxide.

By "titania" we mean titanium dioxide, $TiO_2$.

The volume-median diameter, $D[v,0.5]$, of the modified titania support is in the range 100-1000 μm but is preferably in the range 300-900 m, more preferably 350-650 m, most preferably 400-500 m. The term volume-median diameter $D[v,0.5]$, sometimes given as D50 or D0.5, is defined by Dr Alan Rawle in the paper "Basic Principles of Particle Size Analysis" available from Malvern Instruments Ltd, Malvern, UK (w/ww.malvern.co.uk), and is calculated from the particle size analysis which may conveniently be effected by laser diffraction for example using a Malvern Mastersizer™. Particle sizes are suitably determined according to ASTM D4464.

The titania particles used to prepare the modified catalyst support are available commercially or may be conveniently prepared from commercially available titania powders. Commercially available titania powders typically have a very small particle size, typically less than about 5 micrometres and so the titania support used to prepare the modified catalyst support may comprise agglomerates of such titania powders. The agglomerates may be formed by any suitable shaping technique that produces spheres such as spray-drying, granulation, spray granulation, drip casting or extrusion/spheronization.

The modified titania catalyst support is prepared from un-modified titania particles by impregnation and so the particle size of the modified titania catalyst support is the same as the particle size of the un-modified titania particles.

The titania particles are desirably spherical so that they flow readily when being manipulated and pack consistently in the catalyst bed to provide an acceptable pressure drop over the reactor in which they are placed. The term "spherical" used to describe the support includes shapes with a sphericity (ty), of at least about 0.90, preferably at least about 0.95, and roughly spherical agglomerates of titania powders. The spherical titania particles and the resulting modified catalyst support may be termed "microspheres".

Titania may exist in a rutile or anatase crystalline form. The modified titania catalyst support is preferably an anatase-rich support in which the anatase form of titania is present in an amount >50% by weight of the support. More preferably the modified titania catalyst support has an anatase content of at least 70% by weight of the support, and most preferably at least 80% by weight of the support, e.g.

80-90% by weight, of the support. The anatase form of titania is more porous and softer than the rutile form, making it particularly suitable for use as a Fischer-Tropsch catalyst support. The inclusion of refractory oxides in the catalyst support has been found to advantageously inhibit the transformation of anatase to rutile during the support and catalyst manufacture, allowing higher calcination temperatures to be used.

The modified titania catalyst support is preferably low in elements that have been found to be poisons for the cobalt catalysed Fischer-Tropsch reaction, such as sulphur and the alkali metals. Accordingly, the sulphur content of the modified titania catalyst support is desirably less than 30 ppmw, and the alkali metal (e.g. Na or K) content of the modified titania catalyst support is desirably less than 50 ppmw. Furthermore, to avoid corrosion of catalyst manufacturing and handling equipment, the chloride content of the modified titania catalyst support is preferably less than 1500 ppmw, especially less than 650 ppmw.

The titania support is modified with one or more refractory oxides of metals selected from the group consisting of zirconium, lanthanum, cerium, yttrium and neodymium. The oxides are termed refractory oxides because of their high melting points. Zirconia ($ZrO_2$) is a refractory metal oxide characterized by a high melting point (2715° C.). Similar materials are $La_2O_3$ (2315° C.), $CeO_2$ (2400° C.), $Y_2O_3$ (2425° C.) and $Nd_2O_3$ (2233° C.). The modifying oxide for the titania is therefore one or more of $ZrO_2$, $La_2O_3$, $CeO_2$, $Y_2O_3$ and $Nd_2O_3$. $CeO_2$ is less preferred because, although the strength of the catalyst support is increased, the activity benefits may not be obtained. $ZrO_2$ is preferred because of the balance of catalyst performance, availability and ease of use. The refractory oxide content of the modified catalyst support is in the range of 0.1 to 15% by weight, preferably 1.0 to 10% by weight, most preferably 1.5 to 8.5% by weight.

The pore volume of the modified catalyst support is in the range 0.20 to 0.60 $cm^3/g$, preferably 0.30 to 0.50 $cm^3/g$, more preferably 0.35 to 0.45 $cm^3/g$. The average pore diameter of the modified catalyst support is preferably in the range 30 to 60 nm, more preferably 40 to 50 nm.

The BET surface area of the modified catalyst support may be in the range 25 to 75 $m^2/g$, preferably 45 to 55 $m^2/g$.

BET surface area and nitrogen pore volume may be measured using nitrogen physisorption techniques. The BET Surface area may be determined in this way according to ASTM Method D 3663-03. Pore volume may also be determined using mercury porosimetry. In the present invention, as the pore diameters are relatively large, mercury porosimetry, also known as mercury intrusion porosimetry, may be more suitably used. Mercury intrusion porosimetry is a well-known technique that involves exposing a powdered sample to mercury under pressure and measuring changes in volume. A particularly suitable method for establishing pore volume in this way is ASTM Method D4284-03.

By "average pore diameter", we mean four times the pore volume divided by the surface area (4V/A). This relationship is derived from the geometry of a right circular cylinder with diameter D and height h, for which the surface area (A) is given by $\pi Dh$ and the volume (V) is given by $\pi D^2 h/4$.

The pore volume and average pore diameter of the modified titania support can be effected by calcination. Typically, calcination of a porous material reduces its pore volume. The effect of calcination upon average pore diameter is less predictable and small changes apparently resulting from calcination may in fact be experimental error. Suitably, the pore volume of the un-modified titania particles may be in the range of 0.2 to 0.6 $cm^3/g$. Suitably, the average pore diameter of the un-modified titania particles may be in the range of 30 to 60 nm.

The modified catalyst support is prepared by impregnating a titania support with a refractory metal and drying and calcining the impregnated titania support to form the modified titania support. The impregnation, drying and/or calcination may be repeated if necessary to achieve the desired loading of refractory metal oxide.

The refractory metal may be impregnated into the titania particles by any known method. The refractory metal may be introduced by forming a solution of a suitable refractory metal compound and applying it to the surface of the titania particles in a suitable mixer. The refractory metal compound may be a metal salt, e.g. metal nitrate or oxy-nitrate, or a metal acetate, or a suitable metal-organic compound, such as a metal acetylacetonate. Aqueous solutions are preferred as they are easier to use at large scale. Water-soluble metal compounds such as a refractory metal salts are preferred. Metal nitrates are particularly preferred because they are readily available, are suitably soluble in water and decompose to the oxides without leaving traces of poisons that might reduce the performance of the Fischer-Tropsch catalyst. The impregnation may be conveniently performed at temperatures in the range of 10 to 95° C. The Impregnation may be carried out at reduced or increased pressure or at ambient pressure. The concentration of the refractory metal in the solution is desirably as high as possible to reduce the amount of energy required to remove the solvent.

The volume of the refractory metal compound solution used preferably approximates to the total pore volume of the un-modified titania support, or below it. Such an impregnation advantageously minimises the amount of drying required. In a preferred method, volume of impregnating solution approximates to the pore volume of the titania particles, or below it, and the concentration of the refractory metal in the solution is adjusted to control the amount of refractory metal oxide in the modified catalyst support.

The impregnated support is dried to remove the solvent, typically water, present in the refractory metal compound solution. The drying step is preferably performed at a temperature in the range 50 to 150° C., especially if the solvent is water. The drying step may be performed at atmospheric pressure in air or an inert gas such as nitrogen, or under a vacuum. The drying time may be in the range 0.5 to 16 hours as required, although more preferably it is performed at 80 to 120° C. for 1 to 5 hours.

The dried modified support is typically a free-flowing powder containing the one or more refractory metal compounds. To produce the modified catalyst support, the dried material is subjected to a heat treatment, which may be termed a calcination, to convert the one or more refractory metal compounds to the oxide form. The heat treatment may be performed conventionally in air or by heating the dried material under nitrogen or another suitable gas mixture or by heating under vacuum. The heat treatment may be performed in a static or a moving bed oven, preferably a rotary calciner or a fluidized bed calciner. The calcination temperature is desirably in the temperature range 400 to 900° C., preferably 450 to 850° C., more preferably 450 to 750° C. It is beneficial to use the highest possible calcination temperature since this delivers the largest possible increase in strength without deteriorating the other properties of the modified support. The calcination time may be in the range 0.5 to 16 hours, although preferably it is performed at 400 to 900° C., preferably 450 to 850° C., more preferably 450 to 750° C. for 1 to 4 hours. Under fluid bed conditions, the calcination gas hourly space velocity (GHSV) may be 1000 to 5000 hr$^{-1}$, preferably 2000 to 4000 hr$^{-1}$ at normal temperature and pressure (NTP).

Without wishing to be bound by theory, the modification of the titania particles by the refractory metal compound combined with the high temperature calcination provides the observed enhanced properties of the support and in consequence the resulting catalyst precursor and catalyst. Without the modification, it is not possible to heat the titania particles to the high temperatures required to achieve the improved strength without deteriorating the porosity and anatase content of the support.

The catalyst precursor comprises cobalt oxide crystallites in the pores of the modified titania catalyst support. The cobalt in the precursor may be present as one or more cobalt oxides but preferably cobalt oxide crystallites consist essentially of $Co_3O_4$. The average particle size of the cobalt oxide crystallites may be in the range 6-18 nanometres (nm), preferably 7 to 16 nm, more preferably 8 to 12 nm. The average particle size may be determined by X-Ray Diffraction (XRD). A particularly suitable method uses Bruker D8 Advance XRD equipment with a Cu Kα Wavelength 1.5406 Angstroms with Lynxeye PSD detection. This detection system is useful because the operational setting can be adjusted to suppress the fluorescence generated by the presence of cobalt. Rietveld refinement and line broadening (Scherrer) are common methods of crystallite size determination. Though either method may be used, Rietveld refinement is preferred.

The catalyst precursor may have a ratio of the average cobalt oxide crystallite size to the average pore diameter of the catalyst precursor in the range 0.1:1 to 0.6:1, preferably 0.2:1 to 0.4:1. This ratio is surprising because it is generally considered that the pore diameter of the support controls the metal oxide crystallite size and consequently that pores with a large average diameter will result in large cobalt oxide crystallites. The Applicant has surprisingly found that small cobalt oxide crystallites form in the relatively large pores of the modified titania support. The Applicant has found the combination of the modified titania support physical properties, the cobalt source and preparation conditions produce a Fischer-Tropsch catalyst with enhanced performance compared to un-modified titania-supported catalysts.

The cobalt content of the catalyst precursor may be in the range 5 to 25% by weight, preferably 8 to 16% by weight, expressed as Co on a loss free basis. Despite a relatively low cobalt content, the resulting catalysts have a surprisingly high activity per gram in the Fischer Tropsch reaction. In the active catalyst, at least a portion of the cobalt oxide in the catalyst precursor is reduced to elemental form, which increases the proportion of cobalt in the active catalyst as the oxygen atoms in the cobalt oxide are removed. Particularly effective catalysts comprise 8 to 12% by weight cobalt at a degree of reduction of the cobalt oxide of 270 mol %.

The catalyst precursor possesses the same particle size characteristics as the modified titania support. The catalyst precursor therefore provides a high activity catalyst with an acceptable pressure drop when used in a commercial-scale fixed bed, especially when used as a fixed bed within a catalyst carrier in a multi-tubular Fischer-Tropsch reaction vessel.

The catalyst precursor may optionally further comprise one or more additives, which may be present as oxides, to enhance catalyst performance in the Fischer-Tropsch process. Suitable additives are selected from oxides of one or more additive metals selected from of nickel (Ni), zinc (Zn), thorium (Th), magnesium (Mg), manganese (Mn) or silicon (Si). Alternatively, or in addition, the catalyst precursor may optionally include one or more promoters, which may be present in oxide or elemental form, to improve the activation or reduction of the catalyst. Suitable promoter metals include one or more of rhodium (Rh), iridium (Ir), ruthenium (Ru), rhenium (Re), platinum (Pt) and palladium (Pd). Additives and/or promoters may be incorporated into the catalyst precursor on the modified catalyst support, before or after cobalt impregnation, by use of suitable compounds such as acids, e.g. perrhenic acid, metal salts, e.g. metal nitrates and oxy-nitrates or metal acetates, or suitable metal-organic compounds, such as metal alkoxides or metal acetylacetonates. The amount of additive metal may be varied between 1 and 15% by weight in total, preferably between 1 and 10% by weight in the catalyst precursor. The amount of promoter metal may be varied between 0.01 and 1.00% by weight in total, preferably between 0.01 and 0.50% by weight in the catalyst precursor.

The catalyst precursor is prepared by impregnating the modified titania support with a cobalt compound. This may conveniently be performed by forming a solution of the cobalt compound and applying it to the modified catalyst support. The cobalt compound may be any suitably soluble cobalt compound, such as cobalt salts or cobalt complexes, but cobalt nitrate is particularly suitable as it introduces no catalyst poisons and is relatively straightforward to handle compared to other compounds. The cobalt compound is preferably cobalt (II) nitrate hexahydrate that may be dissolved in its water of hydration, for example by heating to above 50° C., to form a concentrated solution of molten cobalt nitrate. Alternatively, the cobalt nitrate may be dissolved in water or another solvent to form a more dilute solution. Water is the preferred solvent.

The impregnated modified titania support is dried and calcined to form cobalt oxide crystallites within the pores of the modified titania support. The impregnation, drying and/or calcination may be repeated if necessary to achieve the desired catalyst precursor.

The impregnation may be performed by adding a cobalt compound solution to the modified titania support in a suitable mixer, such as a ploughshare mixer. The volume of the cobalt compound solution used preferably approximates to the total pore volume of the modified titania support. Such an impregnation, which may be termed a "dry impregnation" or "incipient wetness impregnation" advantageously improves the deposition of cobalt compounds within the pores of the modified support and minimises the amount of drying required. If desired, suitable compounds of additives and/or promoters may be added in suitable amounts to the cobalt compound solution. Alternatively, they may be combined with the catalyst precursor before or after drying and/or before a final calcination.

The impregnated modified support is dried to remove the solvent, typically water, present in the cobalt compound solution and desirably leave a cobalt compound in the pores of the support. The drying step is preferably performed at a temperature in the range 50 to 150° C. The drying step may be performed at atmospheric pressure in air or an inert gas such as nitrogen, or under a vacuum. The drying time may be in the range 0.5 to 16 hours as required, although more preferably it is performed at 80 to 120° C. for 1 to 5 hours.

The dried impregnated modified support is a free-flowing powder containing one or more cobalt compounds, preferably partially hydrated cobalt nitrate, such as $Co(NO_3)_2 \cdot xH_2O$ where x<6. To produce the catalyst precursor, the dried material is subjected to a heat treatment, which may be termed a calcination, to convert the cobalt compound into cobalt oxide crystallites. The heat treatment may be performed conventionally in air or by heating the dried material under nitrogen or another non-reducing gas mixture or by heating under vacuum. The heat treatment may be performed in static or moving bed ovens or, preferably, in a fluidized bed reactor. A fluidized bed reactor surprisingly has been found to produce catalyst precursors with small average cobalt oxide crystallite sizes, e.g. in the range 6 to 12 nm, especially 8 to 10 nm. The calcination temperature may be in the temperature range 220 to 320° C., preferably 240 to 300° C., to minimise sintering of the cobalt oxide crystallites and maintain the cobalt surface area. The calcination time may be in the range 0.5 to 16 hours as required, although preferably it is performed at 240 to 300° C. for 1 to 4 hours. Under fluid bed conditions, the calcination gas hourly space velocity (GHSV) may be 1000 to 5000 $hr^{-1}$, preferably 2000 to 4000 $hr^{-1}$ at normal temperature and pressure (NTP).

The calcination step may, if desired, be followed by a polishing step in which the calcined material is subjected to heating in a dilute hydrogen stream under conditions that do not cause reduction of the cobalt oxide to elemental form. The polishing step may advantageously be used to lower the residual nitrate content of the calcined material. The hydrogen stream may, for example consist of 0.1 to 10% by volume hydrogen, preferably 1 to 5% by volume hydrogen, in an inert gas, such as nitrogen. The pressure may be 1 to 10 bar absolute, preferably 1 to 3 bar absolute. The maximum temperature for the polishing step may be in the range 100 to 225° C., preferably 140 to 200° C. The polishing step may suitably be performed for 0.5 to 16 hours as required, although preferably it is performed at 140 to 200° C. for 1 to 3 hours. The gas hourly space velocity (GHSV) of the hydrogen/inert gas stream in the polishing step may be 50 to 2000 $hr^{-1}$, but is preferably 50 to 1000 $hr^{-1}$, more preferably 100 to 500 $hr^{-1}$ at normal temperature and pressure (NTP). Under these conditions essentially no reduction of the cobalt oxide takes place. The polishing step reduces residual nitrate in the catalyst precursor down to levels below 0.1% by weight so that the subsequent reduction may be performed without having to take special steps to manage the ammonia that forms during reduction. This is especially useful when the catalyst precursor is reduced in-situ, i.e. in the reactor in which it is to be used for the Fischer-Tropsch process.

The catalyst precursor may be installed in the reactor in which it is to be used for the Fischer-Tropsch reaction and activated to form the catalyst by reduction of at least part of the cobalt oxide to elemental form in-situ. Such activation may be performed using any suitable reducing agent but is preferably performed using a reducing gas stream. The reducing gas stream may be selected from a hydrogen gas stream or a synthesis gas stream comprising hydrogen and carbon monoxide. The reducing gas stream may therefore consist of 1 to 100% by volume of hydrogen in an inert gas such as nitrogen. Alternatively, a synthesis gas containing hydrogen and carbon monoxide, and optionally other components may be used. The synthesis gas may suitably be a Fischer-Tropsch synthesis gas consisting essentially of hydrogen and carbon monoxide in which the hydrogen:carbon monoxide molar ratio may be in the range 1.6 to 2.2. The reducing gas may alternatively comprise a mixture of these gases. The gas hourly space velocity (GHSV) of the reducing gas through the catalyst precursor may be 4000 to 10000 $hr^{-1}$ at normal temperature and pressure (NTP). The gas hourly space velocity of the reducing gas may be altered during the reduction to control the exposure of the cobalt oxide and reduced cobalt to water vapour that is formed as a by-product during the reduction. The maximum temperature used for the reduction stage may be in the range 250 to 400° C. but is preferably in the range 250 to 300° C. to minimise sintering of the reduced cobalt crystallites. The reduction may be performed at ambient pressure or increased pressure, i.e. the pressure of the reducing gas may be from 1 to 50 bar abs.

Alternatively, the catalyst precursor may be pre-reduced ex-situ in a reduction vessel to provide the catalyst. The pre-reduction may be performed using any suitable reducing agent but is preferably performed using a hydrogen gas stream operating in a loop with removal of by-product water from the recycled reduction gas stream. The hydrogen stream may consist of 10 to 100% by volume of hydrogen in an inert gas such as nitrogen. The concentration of hydrogen in the reducing gas stream may be varied during the reduction. The gas hourly space velocity (GHSV) of the hydrogen/inert gas stream may be 4000 to 10000 $hr^{-1}$ at normal temperature and pressure (NTP). The gas hourly space velocity of the reducing gas stream may be altered during the reduction to control the exposure of the cobalt oxide and reduced cobalt to water vapour. The maximum temperature used for the reduction stage may be in the range 250 to 400° C. but is preferably in the range 250 to 300° C. to minimise sintering of the reduced cobalt crystallites. The reduction may be performed at ambient pressure or increased pressure, i.e. the pressure of the reducing gas may be from 1 to 50, preferably 1 to 20, more preferably 1 to 10 bar abs.

Catalysts in the reduced state can be difficult to handle as they can react spontaneously with oxygen, which can lead to undesirable self-heating and loss of activity. Consequently, the reduced catalyst may be protected by encapsulation of the reduced catalyst with a suitable barrier coating. In the case of a Fischer-Tropsch catalyst, this may suitably be a hydrocarbon wax, such as a wax produced by the Fischer-Tropsch synthesis. The encapsulating wax may be removed from the catalyst once installed within the Fischer-Tropsch reactor, for example by heating the catalyst under a hydrogen gas stream or a synthesis gas stream. Alternatively, the reduced catalyst may be passivated by exposure to dilute oxygen in a carrier gas such as nitrogen, such that a protective layer of cobalt oxide forms around each cobalt oxide crystallite.

Whichever route is chosen to convert the oxidic catalyst precursor into an active FT catalyst, cobalt catalysts prepared from a refractory metal modified titania support provide high metal surface areas per gram of reduced metal. For example, the catalyst precursors, when reduced by hydrogen at 250° C., may have a cobalt surface area of 5 $m^2/g$ as measured by hydrogen chemisorption.

The catalyst obtained from the catalyst precursor is particularly effective for the Fischer-Tropsch synthesis of hydrocarbons. The Fischer-Tropsch synthesis of hydrocarbons using cobalt catalysts is well established. The Fischer-Tropsch synthesis converts a mixture of carbon monoxide and hydrogen to hydrocarbons, preferably hydrocarbons with a carbon chain length≥5. The mixture of carbon monoxide and hydrogen is typically a synthesis gas having a hydrogen: carbon monoxide ratio in the range 1.6 to 2.2:1. The reaction may be performed in a continuous or batch process, using one or more reactors such as fixed-bed reactors, slurry-phase reactors, bubble-column reactors, loop reactors or fluidised bed reactors. The process may be operated at pressures in the range 0.1 to 10 Mpa and temperatures in the range 150 to 350° C. The gas-hourly-space velocity (GHSV) for continuous operation may be in the range 1000 to 25000 hr$^{-1}$. The catalysts of the present invention are particularly suitable as fixed bed catalysts, i.e. a bed of catalyst fixed within a reaction vessel through which the reactant synthesis gas is passed.

The catalyst precursor physical properties mean it is suitable for use in a microchannel reactor, i.e. a Fischer-Tropsch reactor having a plurality of catalyst-containing channels having a width or height in the range 2-10 mm through which a synthesis gas is passed.

The catalyst precursor physical properties mean it is especially suitable for use in a catalyst carrier placed in a reaction tube within a Fischer-Tropsch reaction vessel, such as a downflow multi-tubular Fischer-Tropsch reaction vessel.

The catalyst or catalyst precursor has been found to be of particular effectiveness when used in combination with a catalyst carrier suitable for use in a tubular reactor. Any suitable catalyst carrier may be used. By "catalyst carrier" we mean a catalyst container, for example in the form of a cup or can, configured to allow a gas and/or liquid to flow into and out of the carrier and through a bed of the catalyst or catalyst precursor disposed within the carrier. The flow of the gas and/or liquid within the catalyst carrier may be radial and/or axial. Preferably the catalyst or catalyst precursor is disposed as an annular catalyst bed within a central part of the catalyst carrier. The flow through the catalyst bed within the carrier is preferably radial. The catalyst bed may be surrounded by and spaced apart from a heat transfer zone at a periphery. The catalyst bed and heat exchange zone may be in fluid communication with each other. In one arrangement, the catalyst carrier is that described in WO2011/048361, the contents of which are incorporated herein by reference. The catalyst carrier described in WO2011/048361 comprises: an annular container for holding catalyst in use, said container having a perforated inner wall defining a tube, a perforated outer wall, a top surface closing the annular container and a bottom surface closing the annular container; a surface closing the bottom of said tube formed by the innerwall of the annular container; a skirt extending upwardly from the perforated outer wall of the annular container from a position at or near the bottom surface of said container to a position below the location of a seal; and a seal located at or near the top surface and extending from the container by a distance which extends beyond an outer surface of the skirt. In a preferred arrangement, the catalyst carrier may be that disclosed in WO2016/050520, the contents of which are incorporated herein by reference. Thus, the catalyst carrier may comprise: a container suitable for holding the catalyst precursor or catalyst in place, said container having a bottom surface closing the container, and a top surface; a carrier outer wall extending from the bottom surface of said container to the top surface; a seal extending from the container by a distance which extends beyond the carrier outer wall; said carrier outer wall having apertures located below the seal. In a preferred arrangement, the catalyst carrier may comprise: an annular container suitable for holding the catalyst precursor or catalyst in place, said container having a perforated inner containerwall defining an inner channel, a perforated outer containerwall, a top surface closing the annular container and a bottom surface closing the annular container; and a surface closing the bottom of said inner channel formed by the inner container wall of the annular container. The catalyst carrier will generally be sized such that it is of a smaller dimension than the internal dimension of the reactor tube into which it is to be placed in use. The seal will be sized such that it interacts with the inner wall of the reactor tube when the catalyst carrier of the present invention is in position within the reactor tube.

In use in a vertical reactor with downflow, reactants flow downwardly through the reactor tube and thus first contact the upper surface of the catalyst carrier. Since the seal blocks the passage of the reactants around the side of the carrier, the top surface thereof directs them into the inner channel defined by the inner container wall. The reactants then enter the annular container through the perforated inner container wall and then pass radially through the catalyst bed towards the perforated outer container wall. During the passage from the inner container wall to the outer container wall, the reactants contact the catalyst and the Fischer-Tropsch reaction occurs. Unconverted reactants and reaction products then flow out of the container through the perforated outer container wall. The carrier outer wall then directs reactants and products upwardly between the inner surface of the carrier outer wall and the perforated outer container wall of the annular container until they reach apertures in the carrier outer wall. They are then directed through the apertures located in the carrier outer wall and flow downwardly between the outer surface of the carrier outer wall and the inner surface of the reactor tube where heat transfer takes place. In the event that the reactor is operated such that the flow is reversed, the paths of reactants and products will also be reversed.

The catalyst precursor may be loaded into the catalyst carrier and the resulting combination loaded into the reaction tubes of a Fischer-Tropsch reaction vessel for reduction and activation of the catalyst in-situ as described above. Alternatively, the combination may be subjected to a reduction ex-situ in a reduction vessel and the combination encapsulated or passivated. The resulting combination may then be safely loaded into the reaction tubes of a Fischer-Tropsch reaction vessel for a quicker and simpler in-situ activation than in the case where the oxidic catalyst precursor was used.

The invention will now be further described by reference to the following Examples.

In the Examples, the following measurements were performed.

Particle Size: Particle sizes were determined according to ASTM D4464 by laser light scattering using a Malvern Mastersizer 3000 laser diffraction particle size analyser, using the optical properties of $TiO_2$ (Anatase) from the Malvern MS3000 optical property database in the instrument software. (Refractive Index 2.51, Absorption Index 0.01). Wet dispersion measurements were carried out in de-ionised water using 0% and 85% ultrasonication and a stirrer speed of 50% with a Hydro MV sample dispersion unit. Sufficient sample was added to the unit until the laser beam is obscured by between 0.1 and 20%. Five measurements were made for each aliquot of sample, with a measurement duration of 5 seconds. Dry dispersion measurements were made using 0.5 Bar and 3.0 Bar of dispersive air pressure using site compressed air, at a feed rate of 20% in an Aero dry dispersion unit with a micro-volume tray and a standard venturi. One measurement was made per aliquot of sample, with the whole aliquot being measured in each measurement. The measurement duration is 15 seconds when the laser beam is obscured by between 0.1 and 10%. To calculate the results, the Malvern software converts the resulting diffraction pattern into a particle size distribution using Mie Theory.

Pore Volume. Mercury intrusion/extrusion data was measured on a Micromeritics AutoPore 9520 mercury porosimeter in accordance with ASTM Method D4284-03; Test Method for Determining Pore Volume Distributions of Catalysts by Mercury Intrusion Porosimetry. Intrusion curves were measured over the pressure range of 0.5 to 60000 psia followed by extrusion down to atmospheric pressure. An equilibration time of 15 seconds was used for each data point on both the intrusion and extrusion curves, the mercury contact angle was taken to be 1400 and the mercury surface tension taken as 485 dynes/cm. Samples were dried at 115° C. overnight in an oven prior to analysis. Temperature and pressure effects that are manifested during the porosimetry measurement were accounted for by blank correction runs on empty penetrometer tubes which were subsequently subtracted from the experimental data.

Surface areas were measured using a Micromeritics 2420 ASAP physisorption analyser by application of the BET method in accordance with ASTM Method D 3663-03; Standard Test for Surface Area. Nitrogen was used as the adsorbate and the measurements carried out at liquid nitrogen temperature (77K). The cross-sectional area of a nitrogen molecule was taken as 16.2 Å. Samples were outgassed prior to analysis by purging with dry nitrogen gas for a minimum of 1 hour at 140° C. Five relative pressure/volume data pairs were obtained over the relative pressure region of 0.05 to 0.20 P/Po inclusive. The equilibration time for each point was 10 second. Surface areas are reported based on the weight of the sample post outgassing.

Average Pore Diameter. The average pore diameter was calculated from the pore volume and surface area measurements. The average pore diameter is four times the corrected pore volume divided by the calculated surface area (4V/A). This relationship is derived from the geometry of a right circular cylinder with diameter D and height h, for which the surface area (A) is given by $\pi Dh$ and the volume (V) is given by $\pi D^2 h/4$.

Median Pore Diameter. The median pore diameter was derived from the pore volume measurement. By "median pore diameter" we mean the pore diameter representing the mid-point of the cumulative mercury intrusion curve, corrected for interparticle void filling.

Chloride and sulphur content. Chloride and sulphur contents were measured by Combustion Ion Chromatography (CIC). The test sample was heated in a furnace in the presence of flowing moisture containing air. Halides and/or sulphur compounds present in the sample were combusted and released into the air flow. The air exiting the furnace was cooled to generate a liquid condensate. The resultant liquor was diluted to a set volume and an aliquot injected onto an ion chromatography (IC) column, thereby separating the anions of interest. The effluent from the IC column was passed through a conductivity detector generating a set of peaks corresponding to the anions present in the sample. Calibration of the detector using standard anion solutions facilitated calculation of the chloride and/or sulphur content of the sample.

Cobalt Content. Determined by ICPAES (inductively coupled plasma atomic emission spectroscopy) or ICPMS (inductively coupled plasma mass spectrometry) on the calcined catalyst precursors expressed as percentage cobalt by weight on a loss free basis.

Cobalt Oxide Crystallite Size. The cobalt oxide crystallite size was determined by XRD using a Bruker D8 Advance X-Ray Diffractometer. The powdered catalyst precursor sample was pressed into a sample holder and loaded into the instrument. Parallel beam (Gobel mirror) optic. Software; Bruker EVA for phase identification; Topas for pattern refinement. The diffractometer Conditions were as follows:

X-ray Cu Ka Wavelength 1.5406 A with Lynxeye PSD detection.

| Starting 2 theta | 10, |
|---|---|
| Finish 2 theta | 130 |
| Step | 0.022 |
| Step time, sec | 4 |
| X-ray current, mA | 40 |
| X-ray voltage, kV | 40 |

Rietveld analysis (Bruker Topas v4.2) was used to determine cobalt oxide crystallite size. Rietveld refinement of powder XRD data starts with a calculated diffraction pattern based on symmetry information and an approximate structure. Rietveld refinement then uses a least squares minimisation to compare every observed point to the calculated plot and refines the calculated structure to minimise the difference.

Cobalt Surface Area. Cobalt metal surface areas were measured on a Micromeritics 2480 HTP 6 Station Chemisorption Analyser. The samples were reduced with 100% vol hydrogen at 250° C. for 120 minutes at a hydrogen flow rate of 200 SCCM. After the reduction stage was complete, the samples were purged with helium for 15 minutes before being cooled under vacuum to the analysis temperature of 35° C. Evacuation was continued for 45 minutes after achieving a vacuum of <10 μm Hg. The sample was then dosed with 100% vol. hydrogen over a range of pressures between 100 and 760 mmHg. At each pressure, the chemisorbed hydrogen was allowed to equilibrate, and the volume of hydrogen uptake was measure and recorded automatically. Pressure/uptake pairs were plotted to give an isotherm which exhibited a well-defined plateau region. Data points were selected within this region to achieve a best-line fit which was then extrapolated back to zero pressure. The intercept value was used to calculate the cobalt surface area using a stoichiometry of 1.0 for $H_2$/Co and the cobalt surface area reported based on the mass of reduced catalyst.

Example 1: Zirconia-Modified Titania Supports a) Effect of Increasing $ZrO_2$ Content A series of zirconia-modified $TiO_2$ microsphere supports was prepared by incipient wetness impregnation using an aqueous solution of $ZrO(NO_3)_2 \cdot 2H_2O$ (calculated Zr content 34.133% w/w). In each case, 300 g of $TiO_2$ microspheres with a water pore volume of 0.41 $cm^3$/g was weighed out and loaded into a preheated Z-blade mixer (50° C.) and left to warm up for approximately 15 minutes. The mass of zirconium (IV) oxydinitrate dihydrate ($ZrO(NO_3)_2 \cdot 2H_2O$) required for the target $ZrO_2$ loading (stated in the table below) was weighed out into a beaker with 100 ml of demineralized water. This was then placed on a hotplate stirrer and heated to 50° C. Once at temperature it was made up to a volume of 120 $cm^3$ with demineralized water and reheated to 50° C. The solution was then added slowly to mixing $TiO_2$ microspheres in the Z-blade mixer. The addition of the solution took approximately 90 seconds. After the solution was added the sample was mixed for a further 60 seconds. The sample was then discharged from the Z-blade mixer and placed in an alumina saggar. The saggar was loaded into a preheated furnace at 110° C. where it was held for 3 hours. After this the furnace was ramped to 500° C. at 2° C./minute and held for two hours.

| | Required ZrO$_2$ loading (% w/w) | | | | | |
|---|---|---|---|---|---|---|
| | 1.00 | 1.50 | 2.00 | 3.50 | 5.00 | 8.50 |
| Mass of ZrO(NO$_3$)$_2$·2H$_2$O required (g) | 6.57 | 9.91 | 13.28 | 23.60 | 34.25 | 60.45 |

The ZrO(NO$_3$)$_2$·2H$_2$O and TiO$_2$ microspheres were obtained commercially.

The TiO$_2$ microspheres as received had the following typical properties:

| | |
|---|---|
| Average particle size D[v, 0.5]: | 413 μm: |
| Pore volume (Hg Porosimetry): | 0.41 cm$^3$/g |
| Average Pore Diameter: | 40 nm |
| BET Surface area: | 50 m$^2$/g |
| Chloride | 1508 ppmw |
| Air jet Attrition | 68% w/w |
| Anatase/Rutile | 87/13% w/w |

A sample of the un-modified titania microspheres was also calcined at 500° C. for comparison.

It was found that particle strength, as determined by air-jet attrition testing, increased with ZrO$_2$ loading and that the residual chloride content was reduced. The results are set out below.

| ZrO$_2$ Content % w/w | BET Surface Area m$^2$/g | Nitrogen Pore Volume cm$^3$/g | Attrition % w/w | Cl by ClC % w/w |
|---|---|---|---|---|
| 0.0 | 50 | 0.37 | 41 | 530 |
| 1.5 | 51 | 0.37 | 25 | 141 |
| 2.0 | 51 | 0.37 | 28 | 100 |
| 3.5 | 51 | 0.36 | 24 | 109 |
| 5.0 | 49 | 0.35 | 19 | 91 |
| 8.5 | 50 | 0.32 | 12 | 107 |

Despite a significant increase in strength with ZrO$_2$ loading there was no loss of surface area and very little porosity lost as a result of zirconia modification.

b) Effect of Calcination Temperature

The Experiment was repeated with calcination temperatures of 400, 600, 700, 800 and 900° C. The results are set out below:

| Calcination of Un-modified TiO$_2$ | | | | | |
|---|---|---|---|---|---|
| Calcination Temperature ° C. | BET SA m$^2$/g | Nitrogen Pore Volume cm$^3$/g | Chloride content ppm w/w | XRD Anatase % w/w | XRD Rutile % w/w |
| 400 | 51 | 0.38 | 960 | 88 | 12 |
| 500 | 50 | 0.37 | 530 | 87 | 13 |
| 600 | 45 | 0.32 | 257 | 84 | 16 |
| 700 | 19 | 0.17 | 27 | 28 | 72 |
| 800 | 6 | 0.07 | 12 | 3 | 97 |
| 900 | 1 | 0.00 | 27 | 0 | 100 |

While the residual chloride content is reduced as the calcination temperature increases, these results demonstrate the collapse in surface area and porosity and the conversion of anatase to rutile in the absence of the refractory oxide.

| Calcination of TiO$_2$/ZrO$_2$ (8.5% w/w ZrO$_2$) | | | | | |
|---|---|---|---|---|---|
| Calcination Temperature ° C. | BET SA m$^2$/g | Nitrogen Pore Volume cm$^3$/g | Chloride content ppm w/w | XRD Anatase % w/w | XRD Rutile % w/w |
| 400 | 51 | 0.32 | 101 | 86 | 14 |
| 500 | 50 | 0.32 | 107 | 86 | 14 |
| 600 | 49 | 0.32 | 96 | 87 | 13 |
| 700 | 47 | 0.30 | 78 | 87 | 13 |
| 800 | 41 | 0.30 | 56 | 85 | 15 |
| 900 | 22 | 0.16 | 18 | 46 | 54 |

| Calcination of TiO$_2$/ZrO$_2$ (3.5% w/w ZrO$_2$) | | | | | |
|---|---|---|---|---|---|
| Calcination Temperature ° C. | BET SA m$^2$/g | Nitrogen Pore Volume cm$^3$/g | Chloride content ppm w/w | XRD Anatase % w/w | XRD Rutile % w/w |
| 500 | 51 | 0.36 | 109 | 86 | 14 |
| 600 | 49 | 0.35 | 102 | 87 | 13 |
| 700 | 48 | 0.34 | 78 | 86 | 14 |
| 750 | 47 | 0.34 | 71 | 85 | 15 |
| 800 | 41 | 0.32 | 60 | 83 | 17 |
| 900 | 16 | 0.09 | 9 | 16 | 84 |

| Calcination of TiO$_2$/ZrO$_2$ (1.5% w/w ZrO$_2$) | | | | | |
|---|---|---|---|---|---|
| Calcination Temperature ° C. | BET SA m$^2$/g | Nitrogen Pore Volume cm$^3$/g | Chloride content ppm w/w | XRD Anatase % w/w | XRD Rutile % w/w |
| 500 | 51 | 0.37 | 141 | 86 | 16 |
| 600 | 51 | 0.36 | 99 | 86 | 16 |
| 700 | 47 | 0.36 | 73 | 85 | 15 |
| 750 | 44 | 0.36 | 71 | 82 | 18 |
| 800 | 36 | 0.31 | 46 | 75 | 25 |
| 900 | 19 | 0.18 | 17 | 33 | 67 |

Surprisingly, as the calcination temperature was increased, the pore volume and BET surface area and pore volume of the modified supports remained relatively unchanged to a maximum calcination temperature in the range 750 to 80000. This observation was valid for the range of zirconia contents investigated. For each of the ZrO$_2$ modified supports the anatase content by XRD remains stable at 80 to 90% w/w up to a calcination temperature of approximately 750° C. It is clear that addition of low concentrations of ZrO$_2$ changed the manner in which titania responded to calcination, such that higher temperature was required to initiate loss of BET surface area and pore volume. In parallel, the zirconia modification of titania caused transition of anatase to rutile and rutile crystallite growth to occur at a higher temperature than was the case for unmodified TiO$_2$. Like the TiO$_2$, calcination of the modified TiO$_2$ at higher temperatures also resulted in each case in a reduced chloride content.

Example 2: La$_2$O$_3$, CeO$_2$, Y$_2$O$_3$ and Nd$_2$O$_3$ Modified Titania Supports A series of modified TiO$_2$ microsphere supports were prepared using the method of Example 1 using the same titania microsphere support, each with a refractory metal oxide loading of 3.5% w/w and a calcination temperature of 750° C. In each case, 300 g of $TiO_2$ microspheres with a water pore volume of 0.42 cm3/g was weighed out and loaded into the preheated Z-blade mixer at 50° C. and left to warm up for approximately 15 minutes. The mass of modifying metal nitrate crystals required, as stated in the table below, was weighed out into a beaker with 100 ml of demineralized water. This was then placed on a hotplate stirrer and heated to 50° C. Once at temperature it was made up to a volume of 129 cm³ with demineralized water. The extra water added in each catalyst preparation is detailed in the table below. The solution was then added slowly to mixing $TiO_2$ microspheres in the Z-blade mixer. The addition of the solution took approximately 40 seconds. After the solution was added the sample was mixed for a further 30 seconds. After this the sample was discharged from the Z-blade mixer and placed in an alumina saggar. The saggar was loaded into a preheated furnace at 110° C. where it was held for 3 hours. After this the furnace was ramped to 750° C. at 2° C./minute and held for two hours.

| Support produced | 3.5% w/w $La_2O_3$ on $TiO_2$ microspheres | 3.5% w/w $CeO_2$ on $TiO_2$ microspheres | 3.5% w/w $Y_2O_3$ on $TiO_2$ microspheres | 3.5% w/w $Nd_2O_3$ on $TiO_2$ microspheres |
|---|---|---|---|---|
| Mass of $La(NO_3)_3·6H_2O$ (g) | 28.92 | 0 | 0 | 0 |
| Mass of $Ce(NO_3)_3·6H_2O$ (g) | 0 | 27.45 | 0 | 0 |
| Mass of $Y(NO_3)_3·6H_2O$ (g) | 0 | 0 | 36.91 | 0 |
| Mass of $Nd(NO_3)_3·6H_2O$ (g) | 0 | 0 | 0 | 28.35 |
| Mass extra demin water to make up to 129 ml volume (g) | 28.0 | 17.0 | 9.5 | 18.0 |

The Properties of these modified supports are set out below:

| Microsphere Composition | $TiO_2/$ $ZrO_2$ | $TiO_2/$ $La_2O_3$ | $TiO_2/$ $CeO_2$ | $TiO_2/$ $Y_2O_3$ | $TiO_2/$ $Nd_2O_3$ |
|---|---|---|---|---|---|
| BET surface area ($m^2/g$) | 47 | 44 | 41 | 47 | 46 |
| Hg pore volume ($cm^3/g$) | 0.39 | 0.39 | 0.40 | 0.40 | 0.40 |
| Median Hg pore diameter (nm) | 42 | 44 | 47 | 43 | 43 |
| Air jet attrition (% w/w) | 18 | 17 | 19 | 14 | 18 |
| XRD anatase (% w/w) | 85 | 86 | 85 | 87 | 86 |
| XRD rutile (% w/w) | 15 | 14 | 15 | 13 | 14 |
| D[v, 0.5] μm | 411 | 407 | 413 | 413 | 413 |
| ClC ppm w/w chloride | 71 | 166 | 154 | 124 | 134 |

The physical properties of the modified supports are remarkably similar. The anatase/rutile ratio of the parent is preserved, as are the anatase and rutile crystallite sizes. There is a dramatic increase in strength for all of the modifying oxides, with air jet attrition falling from 68% w/w as received to 14-19% w/w (a three to four-fold reduction). Median mercury pore diameter shows a slight increase as a result of the modification process.

Example 3: Catalyst Precursor Preparation

The supports of Example 2 were converted into un-promoted (Co) and promoted (Co/Pt and Co/Ru) oxidic Fischer-Tropsch catalyst precursors. In each case the support was impregnated with metal solutions as required by the target catalyst formulation, dried and calcined. The metal salts used were cobalt(II)nitratehexahydrate, tetraamineplatinum(II)nitrate and ruthenium(III)nitrosylnitrate. The only crystalline form of cobalt oxide identified by XRD in the oxidic FT catalyst precursors was $Co_3O_4$.

a) Zirconia-Modified $TiO_2$ Microsphere Support

Catalyst A: 11% w/w Co on Titania/Zirconia Microspheres 250.00 g of zirconia modified titania microspheres (3.5% w/w $ZrO_2$, calcined at 750° C.) were placed in the preheated mixing chamber of a Z-blade mixer. The circulating water-bath was set at 90° C. 163.4 g of cobalt nitrate hexahydrate crystals and 14.3 g of demineralised water were placed in a stainless-steel beaker and heated on a hotplate to 75° C. The temperature of the titania was 63° C. and the temperature of the mixer walls was 68° C. before addition of solution. The solution was poured into the mixing spheres over 43 seconds. After solution addition mixing was continued for 1 minute. 413.0 g of impregnated material was discharged and placed in 3 stainless steel trays. This material was then dried for 3 hours at 110° C. The temperature was ramped to a calcination temperature of 250° C. at 2° C./minute and held for 2 hours.

Catalyst B: 11% w/w Co, 0.022% w/w Pt on Titania/Zirconia Microspheres 250.03 g of the same zirconia modified titania spheres were placed in the preheated mixing chamber of a Z-blade mixer. The circulating water-bath was set at 90° C. 163.6 g of cobalt nitrate hexahydrate crystals, 2.0 g of tetraammineplatinum(II)nitrate solution (3.367% w/w Pt) and 13.2 g of demineralised water were placed in a stainless-steel beaker and heated on a hot plate to 75° C. The temperature of the titania was 65° C. and the temperature of the mixer walls was 69° C. before addition of solution. The solution was poured into the mixing titania microspheres over 43 seconds. After solution addition mixing was continued for 1 minute. 413.1 g of impregnated material was discharged and placed in 3 stainless steel trays. This material was then dried for 3 hours at 110° C. The temperature was ramped to a calcination temperature of 250° C. at 2° C./minute and held for 2 hours.

Catalyst C: 11% w/w Co, 0.11% w/w Ru on Titania/Zirconia Microspheres 250.3 g of the same zirconia modified titania spheres were placed in the preheated mixing chamber of a Z-blade mixer. The circulating water-bath was set at 90° C. 163.8 g of cobalt nitrate hexahydrate crystals, 2.3 g of ruthenium(III) nitrosylnitrate solution (13.88% w/w Ru) and 12.8 g of demineralised water were placed in a stainless-steel beaker and heated on a hot plate to 75° C. The temperature of the titania microspheres was 64° C. and the temperature of the mixer walls was 66° C. before addition of solution. The solution was poured into the mixing titania microspheres over 40 seconds. After solution addition mixing was continued for 1 minute. 412.3 g of impregnated material was discharged and placed in three stainless steel trays. This material was then dried for 3 hours at 110° C. The temperature was ramped to a calcination temperature of 250° C. at 2° C./minute and held for 2 hours.

For comparative purposes, similar catalysts were prepared using the same method and equipment using the as-received un-modified $TiO_2$ microspheres described in Example 1.

Comparative catalyst D: 11% w/w Co on Titania Microspheres.
Comparative catalyst E: 11% w/w Co, 0.022% w/w Pt on Titania Microspheres.
Comparative catalyst F: 11% w/w Co, 0.11% w/w Ru on Titania Microspheres.

The properties of the oxidic FT catalyst precursors are as follows:

| | FT Catalyst Composition | | |
|---|---|---|---|
| | Catalyst A Co/$TiO_2$/$ZrO_2$ | Catalyst B Co/Pt/$TiO_2$/$ZrO_2$ | Catalyst C Co/Ru/$TiO_2$/$ZrO_2$ |
| BET surface area (m²/g) | 42 | 43 | 41 |
| Cobalt surface area (m²/g) | 6.5 | 7.3 | 6.3 |
| Corrected Hg int volume (cm³/g) | 0.30 | 0.30 | 0.30 |
| Median Hg pore diameter (nm) | 41 | 41 | 42 |
| Air jet attrition (% w/w) | 8 | 9 | 9 |
| XRD anatase (% w/w) | 73 | 73 | 73 |
| XRD rutile (% w/w) | 11 | 11 | 11 |
| ICP cobalt (% w/w) | 11.0 | 11.0 | 10.9 |
| ICP promoter (% w/w) | — | 0.02 | 0.1 |
| Co3O4 average crystallite (nm) | 11 | 10 | 16 |
| D[v, 0.5] μm | 411 | 412 | 413 |
| ClC ppm w/w chloride | 72 | 74 | 70 |
| ClC ppm w/w sulphur | <30 | <30 | <30 |
| LOC (% w/w) | 0.36 | 1.38 | 0.71 |

| | Comparative FT Catalyst Composition | | |
|---|---|---|---|
| | Catalyst D Co/$TiO_2$ | Catalyst E Co/Pt/$TiO_2$ | Catalyst F Co/Ru$TiO_2$ |
| BET surface area (m²/g) | 45 | 46 | 45 |
| Cobalt surface area (m²/g) | 5.4 | 4.6 | 4.9 |
| Corrected Hg int volume (cm³/g) | 0.32 | 0.32 | 0.31 |
| Median Hg pore diameter (nm) | 45 | 45 | 47 |
| Air jet attrition (% w/w) | 11 | 11 | 10 |
| XRD anatase (% w/w) | 75 | 75 | 75 |
| XRD rutile (% w/w) | 10 | 10 | 10 |
| ICP cobalt (% w/w) | 10.8 | 10.9 | 10.8 |
| ICP promoter (% w/w) | — | 0.02 | 0.1 |
| Co3O4 average crystallite (nm) | 11 | 10 | 12 |
| D[v, 0.5] μm | 411 | 410 | 410 |
| ClC ppm w/w chloride | 590 | 630 | 550 |
| ClC ppm w/w sulphur | <30 | <30 | <30 |
| LOC (% w/w) | 1.36 | 1.19 | 1.12 |

The air jet attrition of FT catalyst oxide precursors is lower than that of the precursor support because there is an increase in density associated with the impregnation of catalytic metals onto the support. Catalysts A, B and C made on modified supports have slightly lower attrition than catalysts D, E and F made on unmodified $TiO_2$. The support modification process also resulted in a reduction in the chloride content of the catalyst oxide.

b) Refractory Oxide-Modified $TiO_2$ Microsphere Support Catalyst Precursor Preparation Method for $TiO_2$ Supports Modified with $La_2O_3$, $CeO_2$, $Y_2O_3$ and $Nd_2O_3$.

For each, 50 g of modified $TiO_2$ microsphere supports of Example 2 was weighed out into a plastic bag. Cobalt nitrate hexahydrate, demineralized water and the required promotor (if present) were weighed out into a glass beaker (see table below for weights). The beaker was then heated, and the contents stirred on a hotplate/magnetic stirrer until fully dissolved. The solution was then added in 3 aliquots to the support. Between each addition the bag was sealed, and the contents shaken and kneaded from the exterior of the bag to obtain a free-flowing powder. The mixed intermediate was then placed onto a stainless-steel tray and dried in a preheated oven at 110° C. for three hours. The oven temperature was then ramped at 2° C./minute to a calcination temperature of 250° C. and held for 2 hours.

| | Catalysts | | |
|---|---|---|---|
| | 11% w/w Co only catalyst | 11% w/w Co, 0.022% w/w Pt catalyst | 11% w/w Co 0.11% w/w Ru catalyst |
| Mass of cobalt nitrate hexahydrate (g) | 32.70 | 32.70 | 32.70 |
| Mass of demineralized water used (g) | 0.84 | 0.61 | 0.54 |
| Mass of tetraammineplatinum(II)nitrate solution (g) (3.367% w/w Pt) | 0 | 0.38 | 0 |
| Mass of ruthenium(III)nitrosylnitrate solution (g) (13.88% w/w Ru) | 0 | 0 | 0.47 |

This method was used to produce the following oxidic FT catalyst precursors:

Catalyst G: 11% w/w Co on $La_2O_3$/Titania Microspheres.

Catalyst H: 11% w/w Co, 0.022% w/w Pt on $La_2O_3$/Titania Microspheres.

Catalyst I: 11% w/w Co, 0.11% w/w Ru on $La_2O_3$/Titania Microspheres.

Catalyst J: 11% w/w Co on $CeO_2$/Titania Microspheres.

Catalyst K: 11% w/w Co, 0.022% w/w Pt on $CeO_2$/Titania Microspheres.

Catalyst L: 11% w/w Co, 0.11%/w/w Ru on $CeO_2$/Titania Microspheres.

Catalyst M: 11% w/w Co on $Y_2O_3$/Titania Microspheres.

Catalyst M: 11% w/w Co, 0.022% w/w Pt on $Y_2O_3$/Titania Microspheres.

Catalyst O: 11% w/w Co, 0.11% w/w Ru on $Y_2O_3$/Titania Microspheres.

Catalyst P: 11% w/w Co on $Nd_2O_3$/Titania Microspheres.

Catalyst Q: 11% w/w Co, 0.022% w/w Pt on $Nd_2O_3$/Titania Microspheres.

Catalyst R: 11% w/w Co, 0.11% w/w Ru on $Nd_2O_3$/Titania Microspheres.

The properties of these catalysts are as follows:

| | FT Catalyst Composition | | |
|---|---|---|---|
| | Catalyst G $Co/TiO_2/La_2O_3$ | Catalyst H $Co/Pt/TiO_2/La_2O_3$ | Catalyst I $Co/Ru/TiO_2/La_2O_3$ |
| BET surface area ($m^2/g$) | 43 | 41 | 42 |
| Corrected Hg int volume ($cm^3/g$) | 0.30 | 0.30 | 0.30 |
| Median Hg pore diameter (nm) | 43 | 46 | 45 |
| Cobalt surface area ($m^2/g$) | 5.7 | 6.4 | 5.9 |
| Calculated % w/w cobalt | 11.0 | 11.0 | 11.0 |
| Calculated % w/w promoter | — | 0.02 | 0.11 |
| LOC (% w/w) | 1.51 | 1.54 | 0.91 |

| | FT Catalyst Composition | | |
|---|---|---|---|
| | Catalyst J $Co/TiO_2/CeO_2$ | Catalyst K $Co/Pt/TiO_2/CeO_2$ | Catalyst L $Co/Ru/TiO_2/CeO_2$ |
| BET surface area ($m^2/g$) | 36 | 37 | 39 |
| Corrected Hg int volume ($cm^3/g$) | 0.30 | 0.31 | 0.31 |
| Median Hg pore diameter (nm) | 52 | 53 | 52 |
| Cobalt surface area ($m^2/g$) | 5.6 | 6.0 | 6.1 |
| Calculated % w/w cobalt | 11.0 | 11.0 | 11.0 |
| Calculated % w/w promoter | — | 0.02 | 0.11 |
| LOC (% w/w) | 1.07 | 0.88 | 0.86 |

| | FT Catalyst Composition | | |
|---|---|---|---|
| | Catalyst M $Co/TiO_2/Y_2O_3$ | Catalyst N $Co/Pt/TiO_2/Y_2O_3$ | Catalyst O $Co/Ru/TiO_2/Y_2O_3$ |
| BET surface area ($m^2/g$) | 48 | 47 | 47 |
| Corrected Hg int volume ($cm^3/g$) | 0.29 | 0.31 | 0.31 |
| Median Hg pore diameter (nm) | 43 | 43 | 43 |
| Cobalt surface area ($m^2/g$) | 6.9 | 6.6 | 6.5 |
| Calculated % w/w cobalt | 11.0 | 11.0 | 11.0 |
| Calculated % w/w promoter | — | 0.02 | 0.11 |
| LOC (% w/w) | 1.62 | 1.84 | 1.47 |

| | FT Catalyst Composition | | |
|---|---|---|---|
| | Catalyst P $Co/TiO_2/Nd_2O_3$ | Catalyst Q $Co/Pt/TiO_2/Nd_2O_3$ | Catalyst R $Co/Ru/TiO_2/Nd_2O_3$ |
| BET surface area ($m^2/g$) | 44 | 45 | 45 |
| Corrected Hg int volume ($cm^3/g$) | 0.31 | 0.31 | 0.31 |
| Median Hg pore diameter (nm) | 46 | 44 | 43 |
| Cobalt surface area ($m^2/g$) | 6.0 | 6.4 | 6.7 |
| Calculated % w/w cobalt | 11.0 | 11.0 | 11.0 |
| Calculated % w/w promoter | — | 0.02 | 0.11 |
| LOC (% w/w) | 1.53 | 1.39 | 1.27 |

Example 4: Catalyst Testing

The tests were performed using 0.5 g of the catalyst precursors diluted with 2.00 g SiC placed in a laboratory reactor tube with an internal diameter of 4 mm. After in situ reduction at 300° C. (ramp 1° C./min) in pure hydrogen for 7 hours using a flow rate of 60 ml/min, the temperature was then reduced to 150° C. and the gas is switched to syngas ($H_2$:CO=2:1), and the reactors pressurized to 20 barg using a flow rate of 110 ml/min. After 6 hours, the temperature was increased (1° C./min) to 210° C. and left overnight for about 16 hours. The flow rates were then reduced first to 50 ml/min, then to the required flow rate to achieve 50% syngas conversion and data collection continued for the duration of the test (about 160 hours unless otherwise stated). Inlet gases were metered into the reactor using mass flow controllers. Gaseous, liquid and solid hydrocarbon products and the aqueous phase were analyzed by gas chromatography to achieve a mass balance from which CO conversion and selectivity were calculated. Alpha was calculated from the slope of a plot of $\log(W_n/n)$ as a function of n, for which the gradient is $\log(ac)$, where $W_n$ is the weight fraction of hydrocarbon with carbon number n, and ac is the chain growth probability. This expression was derived from the Anderson Schulz-Flory distribution, $W_n = n\alpha^{n-1}(1-\alpha)^2$. Typically, $C_{20}$-$C_{40}$ was the range of carbon numbers used to calculate alpha. The performance data for the zirconia-modified catalysts are tabulated below.

| FT Catalyst Composition | | | |
|---|---|---|---|
| | Catalyst A Co/TiO$_2$/ZrO$_2$ | Catalyst B Co/Pt/TiO$_2$/ZrO$_2$ | Catalyst C Co/Ru/TiO$_2$/ZrO$_2$ |
| Time on Line Interval (hr) | 103-115 | 104-115 | 104-116 |
| Syngas conversion (%) | 49.9 | 51.6 | 50.0 |
| CH$_4$ selectivity (mol %) | 7.6 | 8.4 | 7.5 |
| CO$_2$ selectivity (mol %) | 0.0 | 0.0 | 0.0 |
| C$_{5+}$ selectivity (mol %) | 90.8 | 89.9 | 90.8 |
| Reactor temperature (° C.) | 210 | 210 | 210 |
| Reactor pressure (barg) | 20.4 | 20.0 | 20.4 |
| GHSV (hr$^{-1}$) | 5169 | 6252 | 4985 |
| Relative activity (to comparative Catalyst D) | 1.57 | 1.95 | 1.51 |
| α | 0.91 | 0.92 | 0.91 |

| FT Catalyst Composition | | | |
|---|---|---|---|
| | Comparative Catalyst D Co/TiO$_2$ | Comparative Catalyst E Co/Pt/TiO$_2$ | Comparative Catalyst F Co/RuTiO$_2$ |
| Time on Line Interval (hr) | 100-112 | 100-113 | 101-113 |
| Syngas conversion (%) | 49.9 | 51.5 | 50.4 |
| CH$_4$ selectivity (mol %) | 6.1 | 6.5 | 6.7 |
| CO$_2$ selectivity (mol %) | 0.0 | 0.0 | 0.0 |
| C$_{5+}$ selectivity (mol %) | 92.6 | 92.0 | 91.8 |
| Reactor temperature (° C.) | 210 | 209 | 209 |
| Reactor pressure (barg) | 20.4 | 20.0 | 20.4 |
| GHSV (hr$^{-1}$) | 3326 | 4672 | 4227 |
| Relative activity (to comparative Catalyst D) | 1.00 | 1.46 | 1.30 |
| α | 0.93 | 0.92 | 0.92 |

On the unmodified TiO$_2$ support platinum and ruthenium promotion shows the expected increase in relative activity compared to unpromoted cobalt, together with a slight increase in methane selectivity. Surprisingly, the TiO$_2$/ZrO$_2$ supported catalysts are significantly more active than their TiO$_2$ supported equivalents. For unpromoted cobalt the relative activity increase is from 1.00 to 1.57 (57%). For the platinum and ruthenium promoted catalyst variants the relative activity increase is respectively 34% and 16%.

The performance data for the other refractory oxide modified catalysts are tabulated below.

| FT Catalyst Composition | | | |
|---|---|---|---|
| | Catalyst G Co/TiO$_2$/La$_2$O$_3$ | Catalyst H Co/Pt/TiO$_2$/La$_2$O$_3$ | Catalyst I Co/Ru/TiO$_2$/La$_2$O$_3$ |
| Time on Line Interval (hr) | 100-110 | 101-112 | 101-112 |
| Syngas conversion (%) | 47.9 | 47.9 | 47.1 |
| CH$_4$ selectivity (mol %) | 7.5 | 8.5 | 8.4 |
| CO$_2$ selectivity (mol %) | 0.0 | 0.0 | 0.0 |
| C$_{5+}$ selectivity (mol %) | 91.8 | 89.8 | 90.2 |
| Reactor temperature (° C.) | 210 | 210 | 210 |
| Reactor pressure (barg) | 20.4 | 20.4 | 20.4 |
| GHSV (hr$^{-1}$) | 6067 | 6631 | 6197 |
| Relative activity (to comparative catalyst D) | 1.76 | 1.92 | 1.76 |
| α | 0.91 | 0.91 | 0.91 |

| FT Catalyst Composition | | | |
|---|---|---|---|
| | Catalyst J Co/TiO$_2$/CeO$_2$ | Catalyst K Co/Pt/TiO$_2$/CeO$_2$ | Catalyst L Co/Ru/TiO$_2$/CeO$_2$ |
| Time on Line Interval (hr) | 100-110 | 101-113 | 101-113 |
| Syngas conversion (%) | 49.5 | 48.1 | 59.9 |
| CH$_4$ selectivity (mol %) | 6.0 | 8.0 | 7.3 |
| CO$_2$ selectivity (mol %) | 0.0 | 0.0 | 0.0 |
| C$_{5+}$ selectivity (mol %) | 93.6 | 90.8 | 92.0 |
| Reactor temperature (° C.) | 210 | 210 | 210 |
| Reactor pressure (barg) | 19.4 | 20.4 | 20.2 |
| GHSV (hr$^{-1}$) | 3383 | 6347 | 5226 |
| Relative activity (to comparative Catalyst D) | 1.00 | 1.84 | 1.57 |
| α | 0.92 | 0.92 | 0.91 |

| FT Catalyst Composition | | | |
|---|---|---|---|
| | Catalyst M Co/TiO$_2$/Y$_2$O$_3$ | Catalyst N Co/Pt/TiO$_2$/Y$_2$O$_3$ | Catalyst O Co/Ru/TiO$_2$/Y$_2$O$_3$ |
| Time on Line Interval (hr) | 100-111 | 101-112 | 101-112 |
| Syngas conversion (%) | 49.7 | 47.9 | 48.4 |
| CH$_4$ selectivity (mol %) | 8.7 | 9.4 | 10.1 |
| CO$_2$ selectivity (mol %) | 0.0 | 0.0 | 0.0 |
| C$_{5+}$ selectivity (mol %) | 89.9 | 88.9 | 88.2 |
| Reactor temperature (° C.) | 209 | 210 | 210 |
| Reactor pressure (barg) | 20.5 | 20.0 | 20.4 |

-continued

| FT Catalyst Composition | | | |
|---|---|---|---|
| | Catalyst M Co/TiO$_2$/ Y$_2$O$_3$ | Catalyst N Co/Pt/ TiO$_2$/Y$_2$O$_3$ | Catalyst O Co/Ru/ TiO$_2$/Y$_2$O$_3$ |
| GHSV (hr$^{-1}$) | 5981 | 6558 | 6407 |
| Relative activity (to comparative Catalyst D) | 1.78 | 1.89 | 1.86 |
| α | 0.91 | 0.90 | 0.90 |

| FT Catalyst Composition | | | |
|---|---|---|---|
| | Catalyst P Co/TiO$_2$/ Nd$_2$O$_3$ | Catalyst Q Co/Pt/ TiO$_2$/Nd$_2$O$_3$ | Catalyst R Co/Ru/ TiO$_2$/Nd$_2$O$_3$ |
| Time on Line Interval (hr) | 102-113 | 97-113 | 100-111 |
| Syngas conversion (%) | 48.5 | 47.9 | 47.1 |
| CH$_4$ selectivity (mol %) | 7.2 | 8.3 | 8.2 |
| CO$_2$ selectivity (mol %) | 0.0 | 0.0 | 0.0 |
| C$_{5+}$ selectivity (mol %) | 91.4 | 90.4 | 90.5 |
| Reactor temperature (° C.) | 209 | 209 | 210 |
| Reactor pressure (barg) | 20.0 | 20.5 | 20.0 |
| GHSV (hr$^{-1}$) | 5300 | 6790 | 6069 |
| Relative activity (to comparative Catalyst D) | 1.54 | 1.97 | 1.73 |
| α | 0.92 | 0.91 | 0.91 |

It is apparent that with the exception of the Co/TiO$_2$/CeO$_2$ catalyst, all of the catalysts prepared from modified TiO$_2$ supports show enhanced activity in comparison to their un-modified TiO$_2$ supported equivalent. The most active catalysts were Catalyst H (Co/Pt/TiO$_2$/La$_2$O$_3$), Catalyst B (Co/Pt/TiO$_2$/ZrO$_2$) and Catalyst Q (Co/Pt/TiO$_2$/Nd$_2$O$_3$). These catalysts have relative activities of respectively 1.92, 1.95 and 1.97, i.e. they were almost twice as active in these tests than the un-modified, un-promoted Catalyst D.

In summary, modification of TiO$_2$ microspheres with a refractory metal followed by drying and high temperature calcination results in a catalyst support that is stronger than the parent microsphere and contains less chloride than the parent microsphere whilst retaining the textural characteristics required to produce an active and selective Fischer-Tropsch catalyst. Cobalt-based Fischer-Tropsch catalysts prepared on TiO$_2$ microsphere supports modified with a refractory metal oxide as described above are in general significantly more active than equivalent catalysts prepared on unmodified TiO$_2$ microspheres.

The invention claimed is:

1. A modified catalyst support in the form of titania particles with a volume-median diameter in the range of 100 to 1000 mm modified with one or more refractory oxides of metals selected from the group consisting of zirconium, lanthanum, cerium, yttrium and neodymium, wherein the total refractory oxide content of the modified catalyst support is in the range of 0.1 to 15% by weight, and the modified catalyst support has a pore volume in the range of 0.2 to 0.6 cm$^3$/g and an average pore diameter in the range of 30 to 60 nm.

2. The modified catalyst support according to claim 1, wherein the volume-median diameter, D[v,0.5], is in the range of 300 to 900 mm.

3. The modified catalyst support according to claim 1, wherein the titania particles are spherical with a sphericity (w), of at least about 0.90.

4. The modified catalyst support according to claim 1, wherein the modified catalyst support has an anatase content of at least 70% by weight of the support.

5. The modified catalyst support according to claim 1, wherein the modified catalyst support has a chloride content of less than 1500 ppmw.

6. The modified catalyst support according to claim 1, wherein the refractory oxide consists of zirconia, ZrO$_2$.

7. The modified catalyst support according to claim 1, wherein the refractory oxide content of the modified catalyst support is in the range of 1.5 to 8.5% by weight.

8. The modified catalyst support according to claim 1, wherein the pore volume is in the range of 0.30 to 0.50 cm$^3$/g.

9. The modified catalyst support according to claim 1, wherein the average pore diameter is in the range of 40 to 60 nm.

10. The modified catalyst support according to claim 1, wherein the modified catalyst support has a BET surface area in the range of 25 to 75 m$^2$/g.

11. A catalyst precursor comprising cobalt oxide crystallites disposed within pores of the modified catalyst support according to claim 1.

12. The catalyst precursor according to claim 11, wherein the cobalt oxide crystallites have an average particle size in the range of 6 to 18 nanometres (nm).

13. The catalyst precursor according to claim 11, wherein a ratio of average cobalt oxide crystallite size to the average pore diameter is in the range of 0.1:1 to 0.6:1.

14. The catalyst precursor according to claim 11, wherein the catalyst precursor has a cobalt content in the range of 5 to 25% by weight, expressed as Co on a loss free basis.

15. The catalyst precursor according to claim 11, wherein the catalyst precursor comprises between 1 and 15% by weight in total of one or more additives, selected from oxides of one or more additive metals selected from nickel (Ni), zinc (Zn), thorium (Th), magnesium (Mg), manganese (Mn) or silicon (Si).

16. The catalyst precursor according to claim 11, wherein the catalyst precursor comprises between 0.01 and 1.00% by weight in total of one or more promoter metals selected from rhodium (Rh), iridium (Ir), ruthenium (Ru), rhenium (Re), platinum (Pt) and palladium (Pd).

17. A process to produce hydrocarbons from a synthesis gas comprising hydrogen and carbon monoxide using the catalyst precursor according to claim 16 in a reactor.

18. A method for preparing the catalyst precursor according to claim 11 comprising the steps of impregnating the modified catalyst support with a cobalt compound to form an impregnated modified titania support and drying and calcining the impregnated modified titania support to form cobalt oxide crystallites within the pores of the modified catalyst support.

19. A combination of the catalyst precursor according to claim 11, disposed within a catalyst carrier suitable for use in a reaction tube of a reactor.

20. A process to produce hydrocarbons from a synthesis gas comprising hydrogen and carbon monoxide using the combination according to claim 19 in a reactor.

21. The combination of the catalyst precursor according to claim 11, disposed within channels in a microchannel reactor.

22. A process to produce hydrocarbons from a synthesis gas comprising hydrogen and carbon monoxide using the catalyst precursor according to claim 11 in a reactor.

23. A catalyst comprising cobalt metal crystallites disposed within the pores of the modified catalyst support according to claim 1.

24. A method for preparing the modified catalyst support according to claim 1, comprising the steps of impregnating titania particles with a volume-median diameter in the range of 100 to 1000 mm, a pore volume in the range of 0.2 to 0.6 cm$^3$/g and an average pore diameter in the range of 30 to 60 nm, with a solution of one or more metals selected from the group consisting of zirconium, lanthanum, cerium, yttrium and neodymium to form an impregnated titania support, and drying and calcining the impregnated titania support to form a refractory metal oxide modified catalyst support comprising refractory oxide in the range of 0.1 to 15% by weight.

25. The method according to claim 24, wherein the calcining step is performed in a moving bed reactor at a temperature in the range of 400 to 900° C.

\* \* \* \* \*